M. CHARPENTIER.
MOP WRINGER ATTACHMENT FOR PAILS.
APPLICATION FILED JAN. 24, 1910.
967,497.
Patented Aug. 16, 1910.
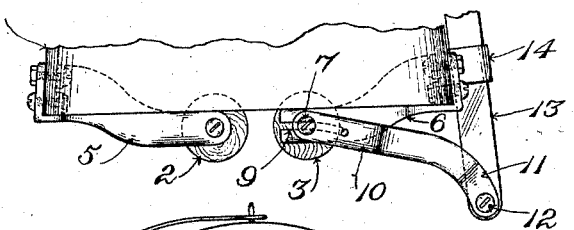
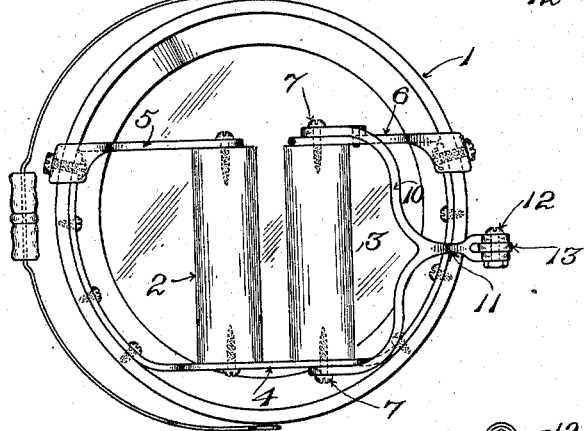
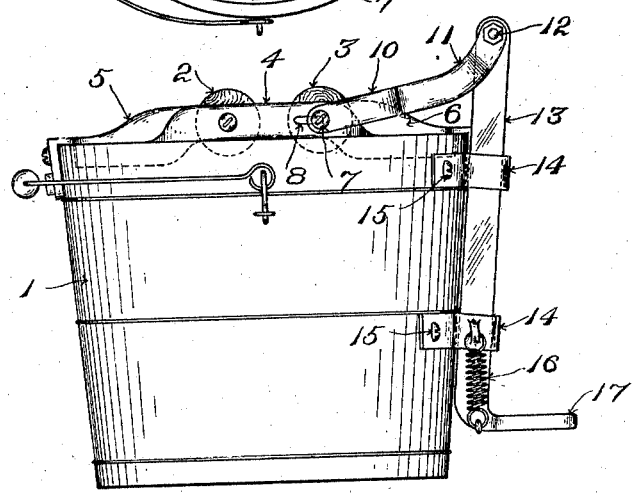
WITNESSES:
Oscar F. Hill
Edith J. Anderson
INVENTOR
Marianne Charpentier
BY
Chas. F. Randall
ATTORNEY

UNITED STATES PATENT OFFICE.

MARIANNE CHARPENTIER, OF LACONIA, NEW HAMPSHIRE.

MOP-WRINGER ATTACHMENT FOR PAILS.

967,497.  Specification of Letters Patent.  Patented Aug. 16, 1910.

Application filed January 24, 1910. Serial No. 539,665.

*To all whom it may concern:*

Be it known that I, MARIANNE CHARPENTIER, a citizen of the United States, residing at Laconia, in the county of Belknap, State of New Hampshire, have invented a certain new and useful Improvement in Mop-Wringer Attachments for Pails, of which the following is a specification, reference being had therein to the accompanying drawings.

The invention consists in improved devices for operating the movably-mounted roll of a wringer attachment.

More particularly, it comprises fixed guides upon the outside of a pail, a bar movable lengthwise in the said guides, a fork having side-arms which engage with the journals of the said roll and an operating arm which is engaged with the said bar, and a spring acting with a tendency to hold the bar in one extreme position and operating to return it to such position after being moved lengthwise therefrom. The parts are constructed and combined so that when the bar occupies the position referred to the movably-mounted roll is separated from the other roll, and that endwise movement of the bar in opposition to the direction of the force exerted by the spring acts through the fork to press one roll toward the other.

An embodiment of the invention in the best form yet contrived by me is shown in the drawings, in which latter,—

Figure 1 is a side elevation of a pail having the said embodiment applied thereto. Fig. 2 is a top view thereof. Fig. 3 is a partial elevation of the side opposite that shown in Fig. 1, the pail being represented as inverted.

Having reference to the drawings,—the pail 1 is, or may be, of ordinary character.

2, 3, are wringer-rolls, and 4, 5, 6, are the supports therefor, such supports being attached to the pail at its top and comprising the cross-bar 4 extending across the top of the pail, and the brackets 5 and 6 which are located in line with each other across the top of the pail but with their inner ends separated by a space for the lateral passage of a mop in being passed into the opening between the two rolls. Roll 2 is journaled at one end thereof in cross-bar 4 and at the other in the inner end of bracket 5, and roll 3 has the journals 7, 7, thereof entered into horizontal slots 8, 9, formed in cross-bar 4 and in the inner end of bracket 6, respectively, so that roll 3 is movable horizontally toward and from the roll 2.

At 10 is the fork. The engagement of the side-arms thereof with the journals 7, 7, of roll 3 is effected by forming the said side-arms with holes which receive the stems of the screws constituting the said journals. The operating arm of the fork is marked 11. The said arm is engaged by means of the pivot 12 with the upper portion of the bar 13. The said bar extends up alongside the outside of pail 1, the guides in which it is mounted being shown at 14, 14, Fig. 1. The latter are attached by screws 15, 15, to the outside of the pail, and serve to confine the bar in the desired position and direct the same in its movements up and down. The bar is so confined that it can move only in the direction of its length.

At 16, Fig. 1, is the spring by which the bar is held normally in its extreme elevated position, such spring being a contracting spiral spring having one end thereof engaged with the bar and the other end thereof engaged with a guide 14.

At 17, Fig. 1, is an outwardly-projecting foot-piece with which the bar is furnished. By placing one's foot upon this foot-piece the bar may be pushed down, overcoming the resistance of spring 16.

The upward movement of bar 13 produced by the action of spring 16 elevates the pivot 12 connecting the operating arm 11 of fork 10 to the bar with relation to the journals 7, 7, of roll 3, the result of which is that the bar operates through the fork to pull roll 3 away from roll 2 in the direction of the length of slots 8, 9, in the cross-bar 4 and bracket 6, until one of the journals 7 brings up against the end of slot 8. See Fig. 1. This arrests the outward movement of roll 3 and the rise of bar 13. The spring normally holds the bar elevated, and the parts in the position shown. Downward pressure upon the foot-piece 17 operating to overcome spring 16 and forcing bar 13 down, will depress pivot 12. The descent of pivot 12 will cause the fork to push roll 3 inward toward the roll 2.

Slot 9, formed in the bracket 6, is made longer than slot 8 in the cross-bar 4. The purpose of this is to allow the corresponding end of roll 3 to be carried back farther than the opposite end, to admit the handle portion of the mop in first applying the latter, and permit the upward passage of any enlargement of the mop so as thereby to facilitate the operation of drawing a mop up between the separated rolls.

It will be observed that there is a species of toggle-action in the case of bar 13, fork 10, and roll 3, which enables the roll 3 to be closed upon the mop with effective pressure, and permits such pressure to be maintained while a mop is being wrung out, with comparatively small exertion of force at the foot-piece 17. The guides 14, 14, resist the outward thrust that acts through fork 10 against the bar 13 as the latter is forced down by pressure applied to its foot-piece 17.

What is claimed is:—

1. In a wringer-attachment, in combination, wringer-rolls, guides for one of such rolls in its movement toward and from the other thereof; an endwise movable bar, guides for confining the same to movement in the direction of its length, and a fork in pivotal engagement with the said bar and with the movable roll, said fork coöperating with said bar and roll after the manner of a toggle in producing movement of the said roll and said guides resisting outward thrust that is transmitted through the fork to the bar.

2. In a wringer-attachment, in combination, wringer-rolls, means for guiding one of such rolls in its movement toward and from the other thereof, an endwise movable operating bar, guides by which said bar is confined to movement in the direction of its length, a fork in pivotal engagement with the said bar and with the movable roll, said fork coöperating with said bar and roll after the manner of a toggle in producing movement of the said roll, and an actuating spring holding said movable roll normally separated from the other roll, said guides resisting outward thrust that is transmitted through the fork to the bar.

In testimony whereof I affix my signature in presence of two witnesses.

MARIANNE CHARPENTIER.

Witnesses:
   JENNIE E. HAINES,
   FLORENCE PLUMMER.